United States Patent [19]

Delorme

[11] 3,945,511

[45] Mar. 23, 1976

[54] ASPHALT STORAGE SYSTEM

[76] Inventor: Ernest Delorme, P.O. Box 212 R.R. No. 3, Tillsonburg, Ontario, Canada

[22] Filed: Jan. 17, 1974

[21] Appl. No.: 434,085

[52] U.S. Cl. .............................. 214/17 C; 222/564
[51] Int. Cl.² ........................................ B65G 65/32
[58] Field of Search ............ 214/17 C, 17 CB, 35 R; 222/564; 302/60; 198/128

[56] References Cited
UNITED STATES PATENTS 2,209,842  7/1940  Murray ............................ 302/60
3,010,620  11/1961  Folse .............................. 222/564
3,415,504  12/1968  Smith et al. ................... 214/35 R X Primary Examiner—Robert G. Sheridan

[57] ABSTRACT

An improved silo for storage of asphalt, or similar materials which contain several different components that tend to separate in handling and storage, comprises first deflector means adjacent the silo inlet for causing material entering the silo to fall evenly over the total silo cross-section and second deflector means adjacent the silo discharge opening for causing materials to fall evenly from the discharge opening.

6 Claims, 5 Drawing Figures

ASPHALT STORAGE SYSTEM

BACKGROUND OF THE INVENTION

1. Field of the Invention

This invention relates to the storage of hot bituminous asphalt and like material, and to improvements in the construction of silos of the type normally used in the industry for the storage of such materials.

2. Description of the Prior Art

A basic problem in the storage of bitumen is the segregation of materials in the mixed condition caused by the method of storage and "angle of respose" of asphalt mixes in containers and angled or cylindrical silos used conventionally in the industrial use of asphalt. The separation of course and fine materials in a mix results in a loss of compact homogeneous qualities leading to porous, weak and sub-standard road paving materials due to aeration and separation.

The above difficulties result, at least partially, from the conventional method of depositing asphalt into silos. Thus, conventional handling is in such a manner that as the asphalt mix falls, it deposits in a more or less conical form. Thus, the asphalt within the silo forms a pile that is higher in the centre than it is at its edges. On the other hand, as the material falls out of the silo for use, the material tends to flow from the centre of the pile only, due to the fact that the outlet from the silo is central. Since the natural pattern of materials dropped in a continuous stream on a conical pile is for the coarser component of the material to migrate to the outside of the pile and the finer material to stay in the centre, then it follows that the material will flow from the silo in an uneven manner leading to inconsistency of texture when the product is finally laid in road paving operations.

Among proposals for dealing with the above difficulties are those disclosed in Canadian Pat. No. 784,409 granted on May 7, 1968, to J. S. Eaton. Eaton proposed to feed asphalt from a conveyor into a silo through a rotatable silo top so that the mix would fall into the silo in a uniform thickness blanket eliminating "coning up." Eaton also provided an adjustable cone near the discharge of the silo so that the material would fall out of it in a uniform manner again to hold segregation of the mix to a minimum.

The unit proposed by Eaton, however, is unnecessarily complex and expensive since it is necessary to provide a mechanically rotatable top to achieve the desired uniform deposition of the material within the silo.

SUMMARY OF THE INVENTION

The present invention seeks to overcome the above disadvantages of prior art structures while achieving the desired objective of uniform deposition of the mix into the silo. This is achieved, in a preferred embodiment, in a surprisingly simple manner by providing a conical baffle adjacent the inlet to the silo, and adjacent the outlet thereof, so that in the first case even deposition of the materials takes place within the silo and in the second case, flow from the silo is also uniform. The simplicity of the present construction results in economies such that the cost of making a silo according to the present invention is only marginally greater than the cost of conventional, unimproved silos.

BRIEF DESCRIPTION OF THE DRAWINGS

A more complete understanding of the improved silos of the invention and their use in handling and storage of asphalt and like materials may be had by reference to the accompanying drawings in which.

Figure 1:
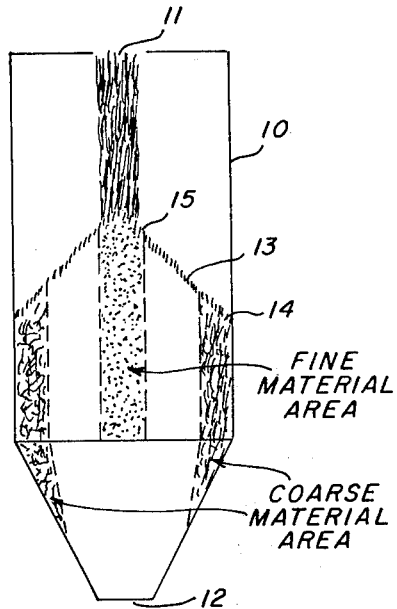
FIGS. 1 and 2 are schematic side sectional views of silos of the prior art.

Dealing first with the prior art, there is shown in FIG. 1 a conventional silo 10 having an inlet 11 and a discharge opening 12. Bituminous material deposited into silo 10 forms a generally conical pile 13. As mentioned above, the tendency is for coarser material in the mix deposited through the opening 11 to migrate to the outer edges of the pile at 14 and for the finer material to remain in the centre generally at 15.

Figure 2:
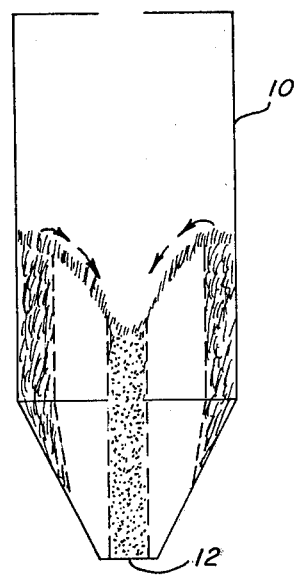

In FIG. 2, the material is seen as it passes from the silo through the discharge opening. The material which is in the centre of the silo tends to pass through the opening first, and thus the finer material is the first to leave the silo. Then, as the finer material passes out it leaves a void in the centre of the mass into which the coarser material previously at the outer edges falls. Thus, separated masses of fine and coarse material can be discharged from such prior art silos.

DESCRIPTION OF PREFERRED EMBODIMENTS

According to the present invention, adjacent the inlet opening 11 of the vertically elongated silo 3 there is provided a conical deflector 20. The deflector is so proportioned that material deposited through the inlet 11 falls on to it and is caused to fall on to the mass 16 in a generally circular pattern. Thus, any tendency for coarse material to migrate to the outer edges of the silo and for the fine material to remain in the centre is eliminated. Instead, an even, properly mixed mass is deposited and remains in the silo until discharged from the outlet 12.

The shape and size of the deflector 20 may, of course, be varied within certain limits as will be obvious to those skilled in the art. In general, however, it should be so proportioned that the material will drop evenly over the full cross-section of the silo and may have a diameter approximately 30% of that of the silo. It may be a circular or square cross-section, or any other suitable shape.

Figure 4:
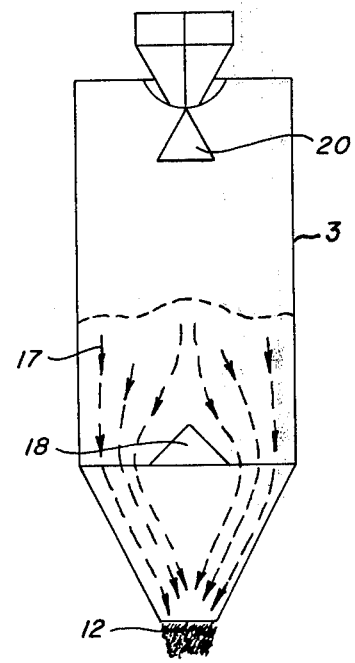

In FIG. 4, the material is seen as it passes through the outlet opening 12. The silo 3 is provided a conical deflector 18, the objective of which is to provide an even flow 17 of material within the silo and to prevent uneven discharge through outlet opening 12. Deflector 18 is spaced a substantial distance from the discharge opening 12 to prevent obstruction of the flow therethrough.

The deflectors may be suspended within the silo in any suitable manner. For example, they may be suspended by suitable frame work attached to the top or sides of the silo.

Figure 3:
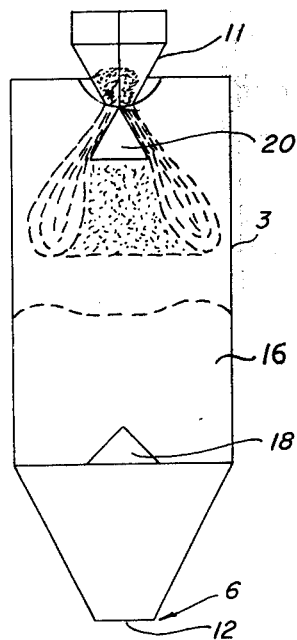
FIGS. 3 and 4 are schematic side sectional views of silos of the invention.
Figure 5:
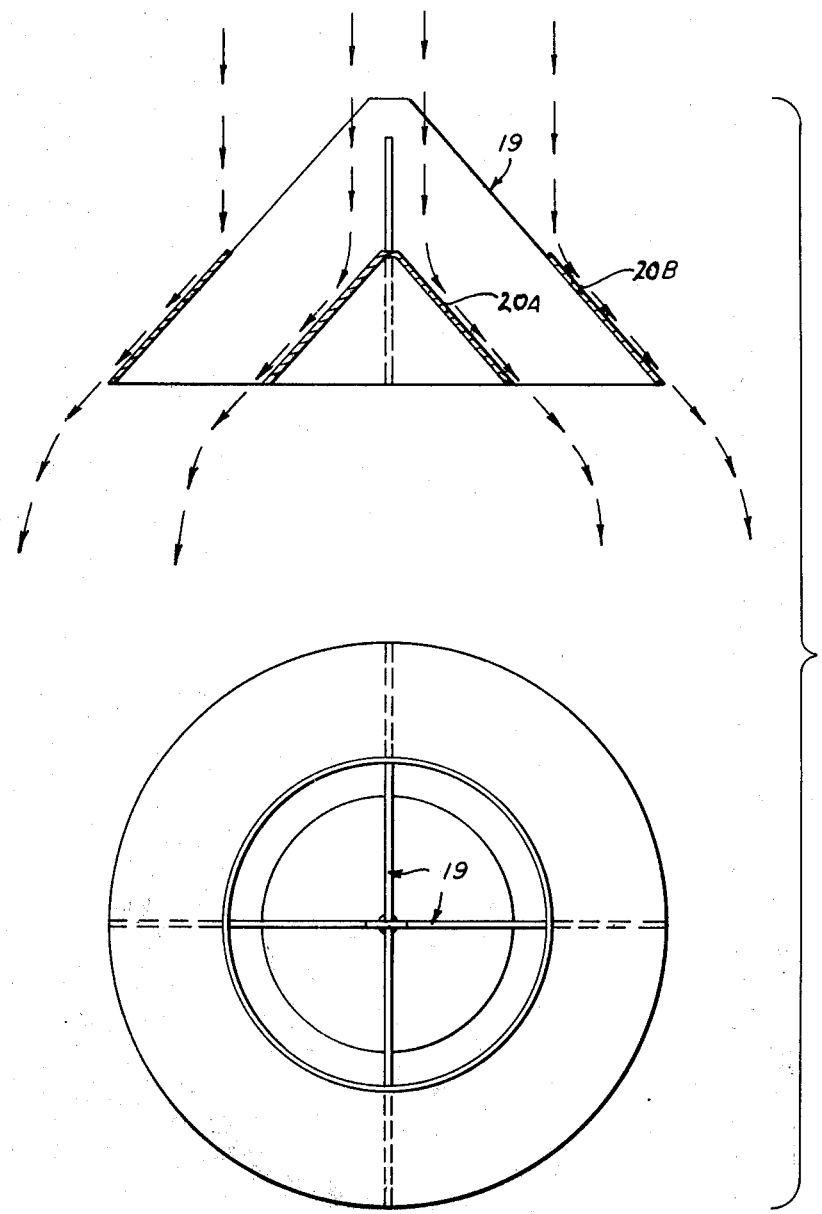
FIG. 5 illustrates a preferred embodiment of conical deflector for silos of the invention and comprises in the upper half a side sectional view and in the lower half a plan view of the deflector.

A preferred form of deflector is illustrated in FIG. 5, in which, as can clearly be seen, a double deflector is shown. The central portion of the deflector 20a is generally similar to the above described deflector in the embodiment of FIGS. 3 and 4. There is provided, however, an annular frustro-conical deflector portion 20b radially outwardly of the deflector 20a. Deflector 20b is spaced from deflector 20a by radial vanes such as those identified by the numeral 19. The form of deflector shown in FIG. 5 is suitable for use in large silos but may advantageously be used in silos of any size.

The embodiments of the invention in which an exclusive property or privilege is claimed are defined as follows:

1. A silo for the storage of asphalt and like materials and subsequent discharge without substantial segregation into different size components which comprises:
   a. a vertically elongated housing,
   b. an inlet opening centrally located at the top of said housing,
   c. a discharge opening centrally located at the bottom of said housing,
   d. a first conical deflector fixed in position beneath said inlet opening adjacent the top of said housing, said first deflector consisting essentially of:
   a stationary cone having its apex facing toward said inlet opening,
   an annular frusto-conical member fixed concentrically around said cone, the maximum radius of said cone being less than the minimum radius of said member, and
   radial vanes extending between said cone and said member holding them in fixed concentric relationship with the top of said member being in substantially the same horizontal plane with the apex of said cone,
   e. a second conical deflector fixed in position above said discharge opening adjacent the bottom of said housing, said second deflector constituting means for causing material within the silo to fall evenly therefrom out of the discharge opening.

2. The silo of claim 1 wherein the base of said cone and the base of said member lie in substantially the same horizontal plane.

3. The silo of claim 2 wherein there are two of said radial vanes, one of which is perpendicular to the other.

4. The silo of claim 1 wherein said housing is circular in cross-section and said first conical deflector has a diameter about 30% that of said housing.

5. The silo of claim 1 wherein said second conical deflector has a diameter substantially equal to the diameter of said first conical deflector.

6. The silo of claim 1 wherein said second conical deflector consists essentially of:
   a stationary cone having its apex facing toward said inlet opening,
   an annular frusto-conical member fixed concentrically around said cone, and
   radial vanes extending between said cone and said member holding them in fixed concentric relationship.

* * * * *